United States Patent Office 3,457,328
Patented July 22, 1969

3,457,328
POLYMERIC ANTIOXIDANTS
Philip Strubing Blatz, Wilmington, and Daniel Edwin Maloney, Hockessin, Del., assignors to E. I. du Pont de Nemours and Company, Wilmington, Del., a corporation of Delaware
No Drawing. Continuation-in-part of application Ser. No. 320,848, Nov. 1, 1963. This application Jan. 25, 1968, Ser. No. 700,367
Int. Cl. C08f 45/58, 29/12
U.S. Cl. 260—857        3 Claims

ABSTRACT OF THE DISCLOSURE

Polymeric antioxidants, suitable for use in stabilizing polyolefins, prepared by the reaction of an ethylene/alpha-beta ethylenically unsaturated carboxylic acid halide with an amine or alcohol radical containing phenol.

---

This application is a continuation in part of application Ser. No. 320,848, filed Nov. 1, 1963.

The present invention relates to polymeric modifiers for the modification of properties of hydrocarbon polymers.

Although hydrocarbon polymers are considered to have an unusual combination of useful chemical and physical properties which are based on the chemical structure of the polymer itself, the utility of hydrocarbon polymers can be improved by the addition of compounds which enhance specific properties of the resin. Such additives include antioxidants, antistatic agents, light stabilizers, flame retardants, plasticizers, water repellants, to mention just a few. Many of these additives, however, have the disadvantage that they are only compatible with the polymer to a limited degree or if compatible will exude out of the material causing a deterioration in the property which is improved by the additive. Many compounds, furthermore, are completely ruled out because of incompatibility and exudation.

It is, therefore, one of the objects of the present invention to provide a method of modifying properties of hydrocarbon and other polymers by the use of additives. It is another object of the present invention to provide polymeric modifiers which are compatible with hydrocarbon polymers and do not exude.

In accordance with the present invention, polymeric modifiers are formed by the reaction of an essentially linear addition polymer of a terminally unsaturated monomer containing at least 0.1 mole percent, based on the copolymer, of a polymerized unsaturated carboxylic acid halide having from 3 to 8 carbon atoms with at least one modifying compound having a molecular weight of less than 2000, containing at least one group reactive with alkanoic acid halides, and recovering a polymeric modifier containing from 0.1 to 50 mole percent based on the copolymer of acid halide groups reacted with said modifying compound. Specific functional groups which react with the acid halide groups of the polymers employed herein are alcoholic hydroxyl groups, amino groups containing at least one hydrogen bonded to nitrogen, i.e., >NH, enolizable carbon hydrogen groups, mercapto groups, thiocarboxylic acid groups and phosphino groups. The acid halide polymers, as do the alkanoic acid halides, react with most compounds which contain a reactive group wherein the reactivity is based on an ionizable hydrogen atom. Those active hydrogen group containing compounds which form alkali metal salts can also be employed in the form of the alkali metal salt derivatives. The ability of any reactive group to react with the acid halide polymer is readily established by a simple test which comprises reacting the compound containing the reactive group with an alkanoic acid halide, such as acetyl chloride. It is, however, to be understood that certain reactive groups, such as primary alcohols and amines, react more readily and, therefore, preferentially with the acid halide polymer. In addition to undergoing reactions based on reactive hydrogen, the acid halide copolymers also react with the metal salt derivatives of compounds containing the aforesaid active hydrogen containing groups, particularly the alkali metal salts. Other means of forming the polymeric modifiers include the reaction of acid halide copolymers with compounds containing aromatic hydrogen in the presence of a Friedel-Crafts catalyst and reaction with Grignard reagents, both of which are typical of alkanoic acid halides.

More specifically, the polymeric modifiers of the present invention are formed by the reaction of a copolymer containing at least 50 mole percent polymerized ethylene and preferably at least 80 mole percent polymerized ethylene (preferably the copolymer is random), and from 0.1 to 25 mole percent polymerized α,β-ethylenically unsaturated carboxylic acid halide having 3 to 8 carbon atoms with a compound having a formula selected from the class consisting of:

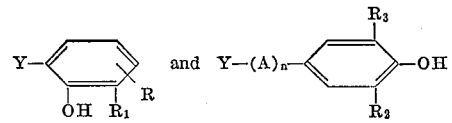

where Y is selected from the class consisting of OH and $NHR_4$ where $R_4$ is selected from the class consisting of hydrogen and alkyl groups having 1 to 6 carbon atoms, R and $R_1$ are selected from the group consisting of hydrogen and alkyl groups having 1 to 8 carbon atoms, A is selected from the class consisting of alkylene groups having 1 to 6 carbon atoms and alkylene oxide groups having the formula

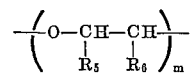

where $R_5$ and $R_6$ are selected from the class consisting of hydrogen and methyl groups and m is 1 to 6, n is zero or 1, $R_2$ contains 1 to 6 carbon atoms and is selected from the group consisting of tertiary alkyl, cycloalkyl and alkyl groups, and $R_3$ is selected from the group consisting of hydrogen and $R_2$, to form a polymeric modifier containing between 0.1 and 20 mole percent based on the total units present, polymerized units derived from α,β-ethylenically unsaturated carboxylic acid having preferably from 3 to 8 carbon atoms and said polymerized units containing a radical having the fomrula

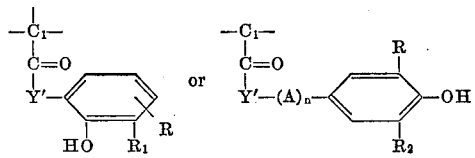

where $C_1$ is a carbon atom in the main copolymer chain, Y' is a Y radical that has reacted thus becoming

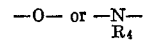

and the other groups are as before specified.

One of the surprising features of the olefin carboxylic acid halide polymers is their ease of reaction. Whereas, polymeric acids and, particularly, copolymers of olefins and carboxylic acids, undergo the reactions of the monomeric acid with extreme sluggishness or not at all, the acid halide copolymers exhibit reactivity which is similar to that of the monomeric acid halide. Hence, it is possible to employ the chemistry of acid halides generally to the polymeric acid halides employed in the present invention.

Although a wide class of comonomers can be employed, excluded from the class are those comonomers which would react with the acid halide groups and cause formation of crosslinked polymers. It will be readily understood that a crosslinked material will not react with the modifying compound to any significant degree and, furthermore, even if reacted, will not increase compatibility. Hence the acid halide copolymers must be substantially linear addition copolymers. The acid halide copolymers employed in the present invention should contain at least one acid halide group per molecule in order to be able to give rise to a polymeric modifier which contains any appreciable concentration of the modifying compound. For practical purposes, the concentration of the acid halide monomer in the polymer should be at least 0.1 mole percent of the polymerized monomer units. Although the acid halide comonomer concentration can be extended to as high as 50 mole percent, it is generally preferred to employ concentrations of not more than 25 mole percent. Such concentrations provide sufficient acid halide groups to which to attach the polymer property modifiers in all desirable concentrations. Higher acid halide ratios reduce compatibility of the polymeric modifiers with hydrocarbon polymers, and, furthermore, leave unreacted acid halide groups. The latter problem, however, is readily overcome by neutralization of the acid halide group with ammonia or other reagents which do not affect the hydrocarbon polymer to which the polymeric modifier is added.

The acid halide copolymers suitable in the formation of polymeric modifiers are obtained by the halogenation of the corresponding acid copolymers using a phosphorus pentahalide which is passed through a solution of the acid polymer. Other methods employed in the formation of the acid halide copolymer are described in copending application Ser. No. 254,567, filed Jan. 29, 1963.

The acid halide groups in the base copolymer are obtained by the polymerization of an $\alpha,\beta$-ethylenically unsaturated acid containing preferably from 3 to 8 carbon atoms which is then halogenated. Examples of such acids are acrylic acid, methacrylic acid, itaconic acid, maleic acid, crotonic acid, fumaric acid, glutaconic acid and cinnamic acid. In the case of the polycarboxylic acids, one of the acid groups can be esterified. Although the acid halide may be a chloride, a bromide, a fluoride or an iodide, it is preferred to employ the chloride because the chlorination reaction of the acid copolymer is readily achieved and controlled, because the reaction with the substrate proceeds smoothly, and because the chloride is the most economic to use.

The preparation of the copolymers from which the acid halide copolymers are derived is well known in the literature and is for that reason not described in detail here. In general, the polymers are formed by direct copolymerization of the monomers employing a free radical catalyst, such as a peroxide. The polymerization is generally carried out in the presence of an inert solvent, such as a liquid hydrocarbon, but may also be carried out in bulk when the monomers are liquid at reaction conditions. A preferred class of copolymers are the random ethylene acid copolymers as may be obtained by use of the technique described in Canadian Patent 655,289, issued Jan. 1, 1963.

The particular composition of the ethylene acid halide copolymer can be varied widely and can be readily tailored to meet the particular application with respect to either the polymer to which the polymeric modifier is added or the chemical compound which imparts the modifying property or both. The acid halide copolymer need not necessarily comprise a two component system. Thus, although the ethylene content of the copolymer should be preferably 50 mole percent, more than one olefin can be employed to provide the hydrocarbon nature of the molecule. Additionally, any stable copolymerizable third monomer can be employed in combination with one or more olefins or carboxylic acid halides. The scope of the acid copolymers suitable for conversion to acid halide copolymers is illustrated by the following examples: Ethylene/acrylic acid copolymers, ethylene/methacrylic acid copolymers, ethylene/itaconic acid copolymers, ethylene/methyl hydrogen maleate copolymers, ethylene/maleic acid copolymers, ethylene/acrylic acid/methyl methacrylate copolymers, ethylene/methacrylic acid/ethyl acrylate copolymers, ethylene/itaconic acid/methyl methacrylate copolymers, ethylene/methyl hydrogen maleate/vinyl acrylate copolymers, ethylene/methacrylic acid/vinyl acetate copolymers, ethylene/acrylic acid/vinyl formate copolymers, ethylene/propylene/acrylic acid copolymers, ethylene/styrene/acrylic acid copolymers, ethylene/methacrylic acid/acrylonitrile copolymers, ethylene/fumaric acid/vinyl methyl ether copolymers, ethylene/vinyl chloride/acrylic acid copolymers, ethylene/vinylidene chloride/acrylic acid copolymers, ethylene/vinyl fluoride/methacrylic acid copolymers, ethylene/chlorotrifluoroethylene/methacrylic acid copolymers, ethylene/acrylic acid/maleic acid copolymers, polyethylene/acrylic acid graft copolymers, polyethylene/methacrylic acid graft copolymers, polymerized ethylene/propylene acrylic acid graft copolymers, polymerized ethylene/butene-1 methacrylic acid graft copolymers, polymerized ethylene/vinyl acetate methacrylic acid graft copolymers.

The polymeric modifiers of the present invention are prepared by the reaction of the acid halide copolymer with a chemical compound having the desired modifying property and containing in addition, preferably, an active hydrogen containing group or its alkali metal derivative. Whether a certain group will react polymeric acid halides is readily established by reference to its reactivity with a simple acid halide such as acetyl chloride. As with monomeric acid chlorides, it has been found that the primary aliphatic amine group —$CH_2NH_2$, the primary alcoholic hydroxyl group —$CH_2OH$, or alkali salts thereof react most readily with the acid chloride containing polymer. In some cases, these groups will give a stoichiometric reaction. In most cases, however, the reaction will go 60 to 90 percent to completion. Should the unreacted acid halide group be undesirable in the polymeric modifier, it can readily be converted to the more inert amide group by addition of, for example, ammonia, which quantitatively converts the acid halide group to the amide group. The by-product of the reaction forming the polymeric modifier is either a hydrogen halide or a metal halide. It is generally preferred that the reaction is carried out such that by-product is removed from the reaction environment during the formation of the polymeric modifier. Where the hydrogen halide is the by-product this is accomplished by carrying out the reaction at elevated temperatures or reduced pressures at which the hydrogen halide is vaporized. In the case of the metal halide, the reaction is carried out in an organic solvent in which the halide is insoluble. A tertiary amine may also be used to inactivate the hydrogen halide by forming an amine salt. The preferred method of preparing the polymeric modifiers comprises carrying out the reaction in an inert hydrocarbon solvent such as benzene, toluene, cyclohexane and saturated hydrocarbon fractions obtained from the cracking of petroleum in which the copolymer is soluble at elevated temperatures. The reaction may further be carried out with polymer swollen with solvent or molten polymer as the medium to which the chemical modifier is added. The reaction may be carried out at any temperatures at which the reagents are stable. Usually, temperatures will range from room temperature to 300° C. Pressure is suitably employed where the solvent would otherwise vaporize at the reaction temperature, but is otherwise not critical. Although the ratio of reagents is preferably stoichiometric or greater with respect to the acid halide groups, less than stoichiometric quantities of the modifier may be employed and will cause the bonding of the modifier to the acid halide copolymer.

Since the function of the acid halide copolymer is to cause the retention of the chemical modifier in the polymer to which it is added and to provide compatibility with the polymer to which the modifier is to be added, the molecular weight of the acid halide copolymer is not critical, although in general a normally solid acid halide copolymer is preferred. A representative range of molecular weights of copolymers is a melt index range (ASTM–1238–57T) of 0.1 to 1000 dg./min.

Although the acid halide copolymers react with most active hydrogen containing organic compounds, the preferred compounds are those which contain a primary amino, a secondary amino, and an alcoholic hydroxyl group —OH. The compounds employed as modifiers may contain more than one of these reactive groups which may be the same or different, and, if the same, may have a different reactivity because of the chemical structure adjacent to the reactive group. In compounds containing two or more reactive groups, the reaction will, in general, occur mainly with the one which contains the most active hydrogen. Compounds which contain more than three groups of equivalent reactivity are generally not employed. The compounds which are reacted with the acid halide copolymers to form the polymeric modifiers are organic compounds which, in general, have molecular weights of less than 2000 and are generally monomeric compounds, although low molecular weight polymeric materials which do not contain the active hydrogen containing group in the repeating monomer unit are also within the scope of the present invention.

The amount of modifier reacted with the acid halide copolymer will differ depending on the proposed untility of the polymeric modifier. Thus, for example, in some applications a high degree of compatibility is desired with a modifier that is effective in low concentrations. If the modifier is highly reactive with the acid halide copolymers, a low concentration acid halide copolymer with right degree of compatibility is selected and only part of the acid halide groups are reacted. Thus, by variation in type and concentration of olefin and acid halide comonomer, and degree of reaction with the modifier, it is possible to tailor the polymeric modifiers to any particular application. The reaction of the acid halide group with the modifier can be controlled to give rise to complete conversion or a fraction thereof. More vigorous reaction conditions, e.g., longer reaction times and higher temperatures and higher concentrations of the modifier will cause a higher degree of conversion. Optimum conditions will differ somewhat with each modifier and each base copolymer. In general, the reaction is most conveniently carried out by using excess quantities of the modifier and letting the reaction proceed to 40 to 80 percent conversion. Accordingly, it is generally preferred to employ a base copolymer which contains acid halide groups in excess of the modifier concentration desired in the polymeric modifier.

A typical method of preparing the polymeric modifiers of the present invention is as follows: Into a glass reaction vessel is charged 225 parts of a hydrocarbon solvent, such as toluene, and 5 parts of an ethylene methacrylyl chloride copolymer having a molecular weight corresponding to a melt index of 40 dg./min. and containing 27 weight percent of the acid chloride comonomer, based on copolymer. The reaction mixture is agitated at 60° C. until the copolymer is dissolved in the solvent. To the solution is added 3 parts of the modifying compound, or such other quantity as will be from 100 to 150 percent of the stoichiometric quantity required to react with all chloride groups of the acid copolymer. Where the modifier is insoluble in the hydrocarbon solvent, i.e., is too polar, the solvent system can be modified by the addition of limited quantities of inert polar solvents, such as pyridine. Such solvents do not cause the precipitation of the copolymer and facilitate solution and, hence, the reaction of the modifier with the acid halide copolymer. Thus, one may add 20 parts of pyridine to the reaction mixture. The reaction mixture is agitated for 16 hours at 60° C. while nitrogen is passed through the mixture. Nitrogen facilitates the removal of hydrogen chloride liberated by the reaction. If the modifier is only slightly soluble in the solvent system employed, it may be advantageous to lengthen reaction time and add the modifier gradually to the reaction mixture. Higher temperatures may, of course, also be employed. The resulting reaction mixture is then optionally treated with ammonia to inactivate remaining acid halide groups in the copolymer by forming the amide. The polymeric modifier formed is isolated by precipitation using a large excess of a strongly polar solvent such as 2000 parts of acetone followed by filtration and drying.

The invention is further illustrated by the following detailed examples. Unless otherwise stated, all percentages and parts are by weight.

EXAMPLE 1

Into a dry two liter flask equipped with stirrer, condenser, thermometer and nitrogen inlet was charged 1500 ml. of dry toluene. This was stirred under nitrogen and heated to 70° C. and then 50 g. of an ethylene-methacrylyl chloride copolymer (made from an 18.6% methacrylic acid copolymer with a melt index of 84) was added. This mixture was stirred at 70° C. until the polymer dissolved and then 15 g. of sublimed o-amine-phenol was added. The resulting solution was stirred at reflux (~110° C.) for about 20 hours. It was then cooled to 50° C. and poured into 8 liters of methanol containing 200 ml. of concentrated ammonium hydroxide with rapid stirring. The polymer was collected by filtration and washed twice with methanol and once with acetone in an Osterizer. It was then dried in a vacuum oven at 40° C. under nitrogen. This yielded 55 g. of a polymer with a melt index of 1.34. An IR scan indicated that good conversion to the corresponding amide had been obtained.

EXAMPLE 2

Into a dry 2 liter flask equipped with stirrer, condenser, thermometer and nitrogen inlet was charged 1600 ml. of dry toluene. This was stirred and heated to ~70° C. and to it was added 100 g. of an ethylene/methacrylyl chloride copolymer (made from an 18.6% methacrylic acid copolymer with and 84 melt index). After the polymer dissolved, 66 g. of recrystallized 3(3',5'-di-t-butyl-4'-hydroxyphenyl)propanol-1 was added and the resulting solution stirred under nitrogen at reflux (~110° C.) for about 20 hours. The solution was then cooled and poured into 10 liters of methanol containing 200 ml. of concentrated ammonium hydroxide. The polymer was collected by filtration and washed twice with methanol and one with acetone in an Osterizer. The polymer was then dried in a vacuum oven under nitrogen at 50° C. This yielded a soft light tan colored polymer with a melt index of 104. An IR scan of the polymer indicated that good conversion to the desired ester derivative was obtained.

EXAMPLE 3

Into a 4 liter resin kettle equipped with stirrer, distilling head, thermometer and nitrogen inlet was placed 3700 ml. of perchloroethylene. This was heated (with heating mantel) to 60° C. and 266 g. of an ethylene/methacrylic acid copolymer (a 24.1% methacrylic acid copolymer with a melt index of ~500) added. This mixture was stirred and heated to reflux. Stirring at reflux was continued until 200 ml. of solvent distilled over. The solution was then cooled to 85° C. and an adding funnel placed between the nitrogen inlet and resin kettle. After adding 0.1 ml. of pyridine to the solution, 58.5 ml. of thionyl chloride in 100 ml. of perchloroethylene was added slowly with rapid stirring. After addition was complete (about 1 hour) the solution was stirred at 85–90° C. for 1 hour. Then about 400 ml. of distillate was collected to remove excess thionyl chloride. The temperature was then dropped about 10° C. and 102 g. of dry catechol added. The solution was then stirred at 110° C. for 16 hours and finally at 120° C. for an additional 4 hours. The solution was then cooled and poured into 15 liters of methanol containing 200 ml. of concentrated ammonium hydroxide. The precipitated polymer was allowed to settle and the solvent siphoned off. Another 12 liters of methanol was added with rapid stirring. After the polymer had settled out, the methanol was siphoned off again. This was repeated twice more and the polymer was then dried in a vacuum oven under nitrogen at 50° C. This gave a light tan colored polymer with melt index of 185. An IR scan indicated that good conversion to the desired ester had been obtained.

p.s.i. pressure. These films were used for oven aging studies. Air oven aging was carried out in a model 1354–3 hot pack oven with internal circulation nearly closed and the air inlet about half open on 6″ x 1½″ x 0.01″ compression molded specimens (as indicated above). The samples were stapled to small strips of soft aluminum foil and attached to clips on a rack in the air oven. Temperature control was about ±3° C. at 150° C. Samples were examined daily and failure noted when either 50% of the sample was embrittled or when five small brittle spots had appeared (spots being cut out of the sample each day as they appeared). The results are shown in Table I. The ranges in MI and MIS and oven life represent a range in a series of samples.

TABLE 1.—EVALUATION OF POLYMERIC ANTIOXIDANTS IN POLYPROPYLENE

| Polymer of— | Percent used | Dilauryl thiodipropionate Percent | MI | MIS | Oven life at 150° C. | Percent of monomeric phenol in polymeric antioxidant |
|---|---|---|---|---|---|---|
| No stabilizer | | | 1.4–3.4 | 2.9–4.9 | 0.1 | 0 |
| 3,5-di-t-butyl-4 hydroxy-benzyl alcohol | 0.7 | 0.5 | 0.8–4.0 | 1.4–1.4 | 3–7 | |
| | 1.0 | 0.5 | 1.3–3.1 | 1.1–1.3 | 5–7 | |
| | 2.0 | 0.5 | 1.4–1.5 | 1.1–1.2 | 9–11 | 32–40 |
| p-Amino-α,αdi-(3,5-di-t-butyl-4-hydroxypehnyl) toluene | 0.2 | 0.5 | 1.5 | 1.0 | 4 | |
| | 0.5–0.7 | 0.5 | 1.6–2.7 | 1.2–1.5 | 8–16 | |
| | 2.0 | 0.5 | 1.0–1.2 | 1.4–1.5 | 32–50 | 50 |
| 4-amino-2,6-di-t-butyl phenol | 0.6 | 0.5 | 0.8–2.0 | 1.3–1.5 | 2–7 | |
| | 2.0–3.0 | 0.5 | 1.1–1.9 | 1.2–1.6 | 5–13 | 32 |
| 2,6-di-t-b-hydroquinone | 0.5–1.0 | 0.5 | 1.1–1.4 | 1.4–1.5 | 11–17 | |
| | 2.0–3.0 | 0.5 | 1.0–2.3 | 1.4–1.5 | 15–28 | 31–38 |
| Catechol | 0.2 | 0.5 | 0.9–2.0 | 1.6–1.7 | 2–10 | |
| | 0.5 | 0.5 | 1.0–2.5 | 1.4–1.6 | 4–13 | |
| | 1.0 | 0.5 | 0.7–3.6 | 1.4–1.6 | 8–16 | |
| | 3.0 | 0.5 | 1.0–1.4 | 1.1–1.4 | 10–14 | 18–23 |
| 3-t-butyl-5-methyl catechol | 0.8 | 0.5 | 2.2 | 1.4 | 6 | 26–33 |
| 3,6-di-isopropyl catechol | 0.2–0.5 | 0.5 | 0.8–1.3 | 1.5–1.7 | 3–8 | |
| | 0.8 | 0.5 | 2.4 | 1.5 | 14 | 28–35 |
| o-Aminophenol | 0.2 | 0.5 | 1.0–1.2 | 1.4–1.8 | 4.5–11 | |
| | 0.5 | 0.5 | 0.7–1.9 | 1.3–1.9 | 6–11 | |
| | 1.0 | 0.5 | 0.8–2.8 | 1.5–1.7 | 6–16 | |
| | 2.0–3.0 | 0.5 | 0.8–1.0 | 1.4–1.5 | 14–18 | 18–23 |
| 2,6-di-t-butyl-4-(2'-hydroxy-ethoxy)phenol | 0.2 | 0.5 | 1.2 | 1.3 | 9 | |
| | 0.8 | 0.5 | 1.0 | 1.4 | 9 | 36–45 |
| 3(3',5',di-t-butyl-4'-hydroxy-phenyl)propan-1-ol | 0.2 | 0.5 | 0.9 | 1.4 | 8–13 | |
| | 1.0 | 0.5 | 0.8 | 1.2 | 16–20 | 34–43 |

EXAMPLE 4

Into a dry 1 liter flask equipped with stirrer, condenser, thermometer and nitrogen inlet was placed 350 ml. of dry toluene. This was heated to ~70° C. and to it was added 50 g. of an ethylene/methacrylyl chloride copolymer (22% methacrylyl chloride and high melt index in the form of a perchloroethylene gel with 20% solids). After the polymer was completely dissolved 7.0 g. of 2,6-di-t-butyl-4-(2-hydroxyethoxy)phenol was added and the solution stirred at reflux (~110° C.) for 20 hours. The solution was then cooled and poured into 1.5 liters of methanol containing 50 ml. of concentrated ammonium hydroxide. The precipitated polymer was collected by filtration and washed twice with methanol and once with acetone in an Osterizer. It was then dried in a vacuum oven at 50° C. This gave a nearly colorless polymer with a melt index 1050. An IR scan indicated that good conversion to the desired ester copolymer was obtained.

EXAMPLE 5

Antioxidants (both monomeric and polymeric) were milled into an unstabilized polypropylene having a melt index of 0.5, at 175–180° C. on a 2″ roll mill using a total milling time of 10 minutes after addition of stabilizers. Melt index measurements (ASTM D–1238–58T condition E—2160 g. load at 190° C.) were made as well as melt index stability (MIS) measurements (ratio of melt index after heating sample at 250° C. for 5 minutes to the standard melt index, both being run as specified above. Samples (10 mil films) were compression molded at 190° C. and 40,000 p.s.i. pressure with a 5–1–2 cycle and then rapid cooling to room temperature under 40,000

Two of the monomeric antioxidants used to react with the ethylene acid halide shown in Table I were specially prepared by the following procedure:

Preparation of 3-(3',5-di-t-butyl-4'-hydroxyphenyl)-propanol-1

Into a 1 liter flask equipped with stirrer, condenser, pressure equalized adding funnel and nitrogen inlet was placed 5.0 g. of lithium aluminum hydride and 50 ml. of anhydrous diethyl ether. This was stirred for several minutes and then to it was added slowly to maintain gentle reflux a solution of 22 g. of the 3-(3',5'-di-t-butyl-4'-hydroxyphenyl)-propionic acid ester of penterythritol in 150 ml. of ether. After addition was complete, the solution was stirred at room temperature for 30 minutes. Then 50 ml. of concentrated hydrochloric acid in 150 ml. of water was added dropwise with rapid stirring. After addition was complete, the mixture was stirred for 30 minutes and the two layers separated. The ether layer was washed once with distilled water, once wtih 5% sodium bicarbonate solution and once more with distilled water. The ether solution was dried over anhydrols sodium sulfate and the ether then evaporated off. This gave, after drying in a vacuum oven at 40° C., 18 g. of a slightly yellow powder. This was recrystallized once from hexane to give a white crystalline powder.

Preparation of p-amino-α,α-di-(3,5-di-t-butyl-4-hydroxyphenyl)-toluene

Into a 500 ml. flask with stirrer, condenser, thermometer and nitrogen inlet was placed 102 g. of 2,6-di-t-butyl phenol, 33 g. of potassium hydroxide and 300 ml. of ethyl alcohol (95%). This was stirred until the solids dissolved and then 25 g. of p-nitrobenzaldehyde was added slowly (over 1 hour period). The solution was then stirred overnight at 30° C. The solution was then poured into a mixture of 500 ml. of water and 300 ml. of methanol with stirring. The solution was acidified to a pH of 3–4 with concentrated hydrochloric acid and stirred at 60° C. for about 15 minutes. The solid product was filtered off, washed well with water-methanol (50/50) on the filter and dried. This gave 120 g. of a red-orange solid. The product was recrystallized from ethanol to give red-orange crystals melting at 172–173° C. An elemental analysis was obtained and checked quite well.

Calculated: C, 77.06; H, 8.62; N, 2.57. Found: C, 76.8; H, 8.80; N, 2.55.

This p-nitro-α,α-di-(3,5-di-t-butyl-4-hydroxyphenyl)-toluene was then reduced to the corresponding amine as follows:

About 37 g. of the p-nitro-α,α-di-(3,5-di-t-butyl-4-hydroxyphenyl)-toluene was reduced to the amino compound by catalytic hydrogenation using a palladium on charcoal catalyst and 400 ml. of n-butyl alcohol in a 1 liter shaker bomb. The reduced product was recovered by filtering off the catalyst and then distilling off most of the solvent. Then small amounts of methanol and water were added with cooling. Repeating the water and methanol additives gave a total of 32 g. of product. This was recrystallized from petroleum ether-benzene mixture to give cream colored crystals. An IR scan indicated that the nitro group had been converted to amine.

EXAMPLE 6

Two series of polypropylene samples were prepared as outlined in Example 5. The first series was stabilized by a monomeric phenol plus 0.5% dilauryl thiodipropionate and the second series by a polymeric phenol prepared from the corresponding monomeric additive in combination with the same amount of dilauryl thiodipropionate. Table 2 shows that the polymeric additives (based on weight of phenol present) in general are much more effective than the monomeric phenols.

TABLE 2.—ANTIOXIDANTS, POLYMERIC vs. MONOMERIC IN POLYPROPYLENE

| Antioxidant [1] | Percent | M.I. | MIS | Oven life days at 150° C. |
|---|---|---|---|---|
| Catechol | 0.2 | 0.921 | 1.65 | 8 |
| Catechol polymer | 0.2 | 0.938 | 1.58 | 10 |
| Do | 1.0 | 0.957 | 1.38 | 16 |
| o-Aminophenol | 0.2 | 0.795 | 1.48 | 7 |
| o-Aminophenol polymer | 0.2 | 1.049 | 1.40 | 11 |
| Do | 1.0 | 0.768 | 1.49 | 16 |
| 2,6-di-t-butyl hydroquinone | 0.2 | 0.904 | 1.58 | 6.5 |
| 2,6-di-t-butylhydroquinone | 0.5 | 1.018 | 1.42 | 15 |
| Polymer | 0.7 | 0.974 | 1.35 | 17 |
| 2,6-di-t-butyl-4-(2'hydroxyethoxy) phenol | 0.2 | 0.754 | 1.53 | 8–9 |
| Polymer of above | 0.2 | 1.167 | 1.30 | 9 |
| 3,5-di-t-butyl hydroxybenzyl alcohol | 0.2 | 0.835 | 1.55 | 8 |
| Polymer of above | 0.7 | 0.819 | 1.39 | 7 |

[1] Polymeric antioxidants contain 20–25% of the indicated phenol.

EXAMPLE 7

Samples of stabilized polypropylene were prepared as described in Example 5 and compression molded into 5 mil films. Several samples of each composition were placed into 200 ml. of perchloroethylene at 40° C. for 20 minutes. They were then removed, washed with acetone and dried in a vacuum oven at 50° C. for 1 hour. A second series of samples of each composition were placed in 200 ml. of a sulfonic acid detergent solution (0.5 g. of detergent per liter of distilled water) at 90° C. for 4 hours. The samples were then removed, washed with water and acetone and dried at 50° C. in a vacuum oven for 1 hour. The amount of stabilizer extracted in each case was determined by taking UV spectra before and after extraction. Results are shown in Table 3.

TABLE 3.—EXTRACTABILITY OF POLYMERIC STABILIZERS [1]

| Stabilizer | Percent stabilizer retained | |
|---|---|---|
| | Perchloroethylene extraction | Detergent extraction |
| o-Aminophenol polymer | 100 | 98 |
| Catechol polymer | 99 | 100 |

[1] All samples contained 0.2% of the indicated antioxidant. The amount of stabilizer retained was determined by UV spectra taken before and after extraction.

EXAMPLE 8

Stabilized samples of an ethylene-butene-1 copolymer containing about 2–3% butent-1, density 0.948, MI=0.21 were compounded on a 6 inch two roll mill at 160° C. Oxidative, thermal and color stability of these samples is shown in Tables 4 and 5. Yield strength, YS, and percent elongation, E%, were measured on micro tensile bars 10 mils thick in accordance with ASTM Method D–638–61T at 2 inch per minute strain rate.

TABLE 4.—THERMAL AND COLOR STABILITY

| Additive | (Cond., p.p.m.) | MI | 250° | 300° | Color [1] | | |
|---|---|---|---|---|---|---|---|
| | | | | | Initial | 30 min. at 200° C. | 60 min. at 200° C. |
| None | | 0.24 | 0.48 | 0.29 | 1 | 2 | 3–4 |
| A | 750 | 0.20 | 0.40 | 0.30 | 1 | 2 | 4 |
| B | 500 | 0.23 | 0.52 | 0.35 | 3 | 3–4 | 4 |
| C | 1,250 | 0.21 | 0.72 | 0.43 | 2 | 2–3 | 4 |

[1] Color Code:
  1 White.
  2 Off white, tan.
  3 Yellow.
  4 Brown.
Additive:
  A Ethylene/2,5-di-t-butyl-4-methacryloxyphenol.
  B Ethylene/α,α-di(3,5-di-t-butyl-4-hydroxyphenyl)-4-methacrylamidotoluene.
  C Ethylene/2-methacrylamidophenol.

TABLE 5.—OXIDATIVE STABILITY [1]

| Tensile Characteristics | Additive | | | |
|---|---|---|---|---|
| | None | A | B | C |
| Unaged: | | | | |
| YS | 2,980 | 3,330 | 3,530 | 3,260 |
| Percent E | 726 | 360 | 455 | 340 |
| 1 week: | | | | |
| YS | Brittle | 3,780 | 3,630 | 3,760 |
| Percent E | | 700 | 460 | 560 |
| 2 weeks: | | | | |
| YS | Brittle | 3,790 | 3,750 | 3,750 |
| Percent E | | 440 | 90 | 440 |
| 3 weeks: | | | | |
| YS | Brittle | Brittle | 3,780 | 3,890 |
| Percent E | | | 175 | 460 |
| 4 weeks: | | | | |
| YS | Brittle | Brittle | Brittle | [2] NT |
| Percent E | | | | |
| 5 weeks: | | | | |
| YS | | | | 3,680 |
| Percent E | | | | 135 |
| 6 weeks: | | | | |
| YS | | | | Brittle |
| Percent E | | | | |

[1] Micro tensiles aged at 120° C.
[2] NT=Not tested.

EXAMPLE 9

To a 225 g. toluene solution of 5 g. of an ethylene methacrylyl chloride copolymer, containing 27 percent of acid chloride and having a molecular weight corresponding to a 40 dg./min. melt index, was added 3.4 g. of 4-hydroxymethyl-2,6-di-t-butyl phenol and 25 ml. of pyridine. The reaction mixture was agitated for eight hours at 43° C. At the end of that time 3.3 g. of 2(o-aminophenyl) benzotriazole was added to the reaction mixture and the reaction mixture was agitated for 16 hours at 60° C. Ammonia was then passed through the solution and the resulting polymeric modifier was recovered by pouring the reaction mixture into an excess of acetone, filtering, washing and vacuum drying the precipitate formed. Infrared analysis of a thin film of the polymeric modifier showed that about equal amounts of the phenol and the benzotriazole were bonded to the copolymer and that the polymeric modifier containing about 15 percent of each species of modifier. When added to polyethylene in a concentration of 1.0 percent the polymeric modifier improved both the oxidation stability and screened out ultraviolet light.

This polymeric modifier was added to polypropylene containing ¼% distearyl thiodipropionate in the amount of 0.5%. The polymeric modifier contained about 0.10% of each of the modifier. The oxidative stability of the polypropylene as measured at 150° C. with air exposure was 20 days. Similar samples of polypropylene containing 0.5% "monomeric" 4-hydroxymethyl-2,6-di-t-butyl phenol and 0.5% polymeric modifier containing 0.17% 4-hydroxymethyl-2,6-di-t-butyl phenol had stabilities of 31 and 24 days respectively, while the polypropylene containing no stabilizers had stabilities of only 1–2 hours.

The foregoing examples have illustrated the formation of polymeric modifiers. It will be apparent that more than one copolymer can be employed with one modifier to form the polymeric modifier and similarly that more than one modifier can be employed with a single copolymer. The latter is particularly advantageous since it allows the improvement of several properties of the polyolefin resin by the addition of a single additive.

It is to be understood that the utility of the polymeric modifiers are particularly satisfactory in polyolefins such as polyethylene, polypropylene, polybutene, poly-4-methyl pentene, copolymers of ethylene with 4-methyl pentene, butene-1, propylene, and vinyl esters such as vinyl acetate, and ionic copolymer resins of α-olefins having the formula R—CH=CH$_2$, where R is a radical selected from the class consisting of hydrogen and alkyl radicals having from 1 to 8 carbon atoms, and α,β-ethylenically unsaturated carboxylic acids having from 3 to 8 carbon atoms, said copolymers having from 10% to 90% of the carboxylic acid groups ionized by neutralization with metal ions uniformly distributed throughout the copolymer, said copolymer being a direct copolymer of the α-olefins and the unsaturated carboxylic acid in which the carboxylic acid groups are randomly distributed over all molecules and in which (1) the α-olefin content of the copolymer is at least 50 mol percent, based on the α-olefin-acid copolymer, (2) the unsaturated carboxylic acid content of the copolymer is from 0.2 to 25 mol percent, based on the α-olefin-acid copolymer, and (3) any other monomer component optionally copolymerized in said copolymer is monoethylenically unsaturated, and said metal ions having an ionized valence of from one to three inclusive when the unsaturated acid is a monocarboxylic acid and an ionized valence of one when the unsaturated acid is a dicarboxylic acid and said metal ions being selected from the group consisting of uncomplexed and complexed metal ions, said ionic copolymers having solid state properties characteristic of crosslinked polymers and melt-fabricability properties characteristic of uncrosslinked, thermoplastic polymers, such as described in U.S. Patent 3,264,272, issued Aug. 2, 1966, to Rees, when added in the amount of 0.01 to 5% by weight of the polyolefin, but can be employed broadly in all resinous substances such as polyesters, polycarbonates, polyoxymethylenes, polyamides, cellulose esters, polyvinyl halides, polyacrylates, etc.

In addition to their utility as additives, the polymeric modifiers also have utility as polymers. Thus, they can be be employed as coating resins, in the form of film, dispersions and solutions and as laminating adhesives.

What is claimed is:
1. A polymer containing (A) 0.1 to 20 mole percent based on the total units present, polymerized units derived from α,β-ethylenically unsaturated carboxylic acid having a formula selected from the class consisting of

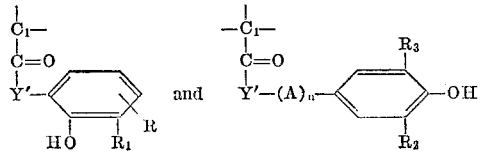

where $C_1$ is a carbon atom in the main copolymer chain, Y' is selected from the class consisting of O and NR$_4$ where R$_4$ is selected from the class consisting of hydrogen and alkyl groups having 1 to 6 carbon atoms, R and R$_1$ are selected from the class consisting of hydrogen and alkyl groups having 1 to 8 carbon atoms, A is selected from the class consisting of alkylene groups having 1 to 6 carbon atoms and alkylene oxide groups having the formula

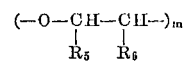

where R$_5$ and R$_6$ are selected from the class consisting of hydrogen and methyl groups, and m is 1 to 6, n is zero or 1, R$_2$ is an alkyl group having 1 to 6 carbon atoms and R$_3$ is selected from the group consisting of hydrogen and R$_2$, and (B) at least 50 mole percent polymerized ethylene units.

2. A stabilized polyolefin composition containing 0.1 to 50% of the composition of claim 1 in which the polyolefin is selected from the class consisting of polyethylene, polypropylene, polybutene, poly-4-methyl pentene, copolymers of ethylene and 4 methyl-pentene, copolymers of ethylene and butene-1, copolymers of ethylene and propylene, copolymers of ethylene and vinyl esters and ionic copolymer of α-olefins having the formula R—CH=CH$_2$, where R is a radical selected from the class consisting of hydrogen and alkyl radicals having from 1 to 8 carbon atoms, and α,β-ethylenically unsaturated carboxylic acids having from 3 to 8 carbon atoms, said copolymers having from 10% to 90% of the carboxylic acid groups ionized by neutralization with metal ions uniformly distributed throughout the copolymer, said copolymer being a direct copolymer of the α-olefins and the unsaturated carboxylic acid in which the carboxylic acid groups are randomly distributed over all molecules and in which (1) the α-olefin content of the copolymer is at least 50 mol percent, based on the α-olefin-acid polymer, (2) the unsaturated carboxylic acid content of the copolymer is from 0.2 to 25 mol percent, based on the α-olefin-acid copolymer, and (3) any other monomer component optionally copolymerized in said copolymer is monoethylenically unsaturated, and said metal ions having an ionized valence of from one to three inclusive when the unsaturated acid is a monocarboxylic acid and an ionized valence of one when the unsaturated acid is a dicarboxylic acid and said metal ions being selected from the group consisting of uncomplexed and complexed metal ions, said ionic copolymers having solid state properties charatceristic of crosslinked polymers and melt-fabricability properties characteristic of uncrosslinked, thermoplastic polymers.

3. The composition of claim 1 in which A is

—CH$_2$CH$_2$CH$_2$— n is 1 and R$_2$ and R$_3$ are tertiary butyl.

References Cited

UNITED STATES PATENTS 2,938,883  5/1960  Raich _____ 260—45.85
3,110,699  11/1963  Schmitz-Josten _____ 260—62
3,320,116  5/1967  Tucker _____ 161—252

FOREIGN PATENTS 971,753  10/1964  Great Britain.

WILLIAM H. SHORT, Primary Examiner
M. GOLDSTEIN, Assistant Examiner

U.S. Cl. X.R.

106—181, 186; 260—479, 485, 562, 873, 897, 17, 45.9, 45.85, 47, 62

PO-1050
(5/69)

UNITED STATES PATENT OFFICE
CERTIFICATE OF CORRECTION

Patent No. 3,457,328                Dated July 22, 1969

Inventor(s) PHILIP STRUBING BLATZ and DANIEL EDWIN MALONEY

It is certified that error appears in the above-identified patent and that said Letters Patent are hereby corrected as shown below:

CLAIM 2:   Column 12, line 2, "50%" should be -- 5% --;
           Column 12, line 41, "polymer" should be -- copolymer --.

SIGNED AND
SEALED
AUG 25 1970

(SEAL)
Attest:

Edward M. Fletcher, Jr.
Attesting Officer

WILLIAM E. SCHUYLER, JR.
Commissioner of Patents